Aug. 20, 1940.   J. M. RUSNAK   2,212,406
TOOL MOUNTING FOR MACHINE TOOL SPINDLES
Filed June 16, 1938
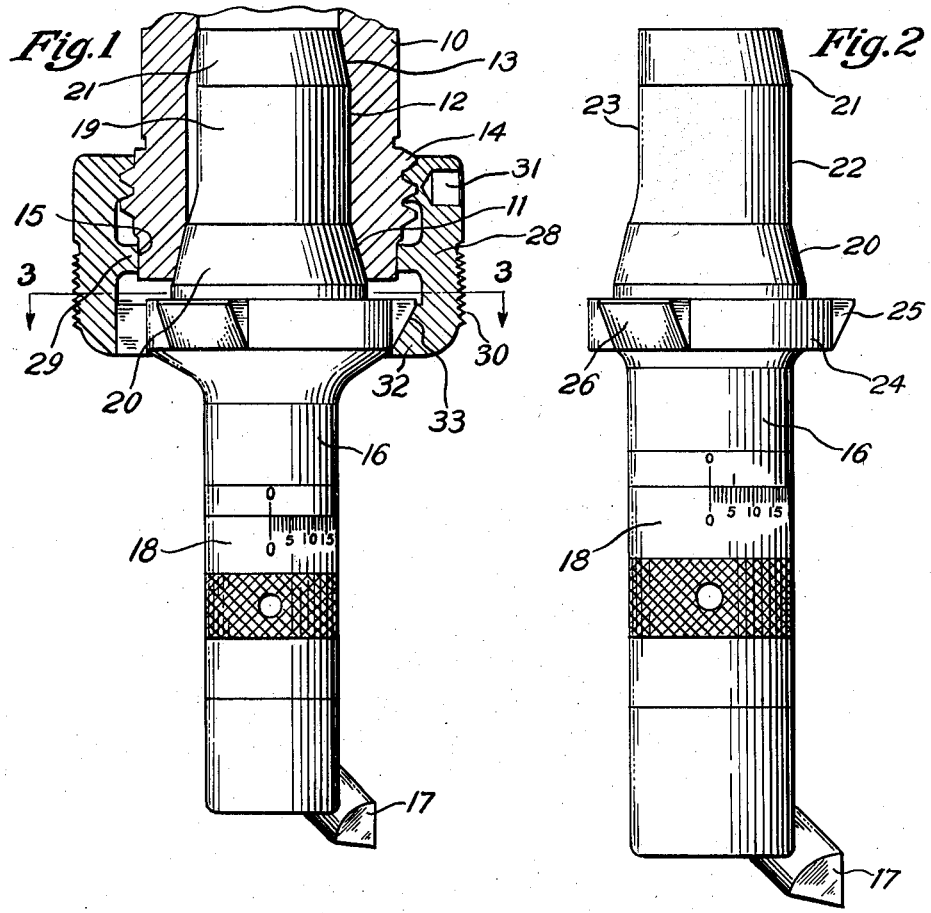
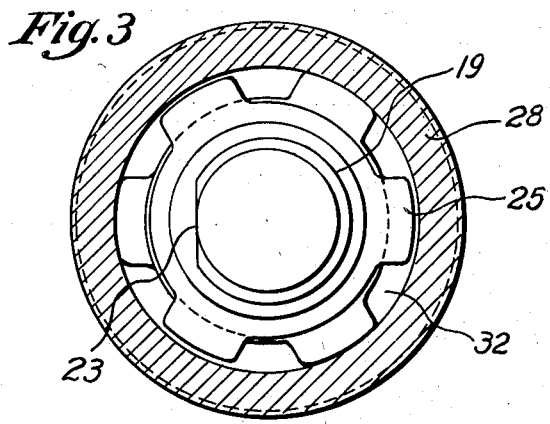
INVENTOR
J. M. Rusnak
BY
Joseph N. Schofield
ATTORNEY Patented Aug. 20, 1940

2,212,406

UNITED STATES PATENT OFFICE 2,212,406

TOOL MOUNTING FOR MACHINE TOOL SPINDLES

John M. Rusnak, West Hartford, Conn., assignor to Niles-Bement-Pond Company, Hartford, Conn., a corporation of New Jersey Application June 16, 1938, Serial No. 213,991

2 Claims. (Cl. 279—91)

This invention relates to machine tools and particularly to tool mounting means for rotating spindles of machine tools.

An object of the invention is to provide an improved but simple mounting and securing means for a tool such as an adjustable boring tool extending within a recess formed within a rotatable tool spindle and rigidly forced therein to accurate coaxial position.

A feature which enables the above object to be accomplished is that the spindle is provided with spaced conical surfaces adapted to engage corresponding conical surfaces on the spindle entering end of a tool.

Another object of the invention is to provide a positive clamping collar for forcing the tool into the recess of the spindle with its conical surfaces forced into contact with the conical surfaces of the spindle.

And finally it is an object to provide spaced outstanding lugs on the tool adjacent its spindle entering end adapted to pass through openings within the clamping collar to facilitate mounting and securing the tool in position within the spindle.

With the above and other objects in view the invention includes the features of construction and operation set forth in the following specification and illustrated in the accompanying drawing.

In the accompanying drawing annexed hereto and forming a part of this specification I have shown the invention embodied in the spindle of a vertical boring or drilling machine but it will be understood that the invention can be otherwise embodied and that the drawing is not to be construed as defining or limiting the scope of the invention, the claims appended to this specification being relied upon for that purpose.

In the drawing:

Figure 1 is a vertical elevation of a tool shown in position within the lower end of a machine tool spindle, the spindle being shown in section.

Fig. 2 is a view of the tool apart from the spindle and clamping means; and

Fig. 3 is a horizontal sectional view taken upon the plane of line 3—3 of Fig. 1.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a rotatable tool spindle having an axially extending recess within its tool mounting end, there being axially spaced conical tool engaging surfaces therein; second, a screw threaded portion on the outer surface of the spindle adjacent its end; third, a short cylindrical surface at the end of the spindle; fourth, a collar threaded upon the spindle and having a fragmentary or interrupted conical surface within its lowermost portion and having an internal flange closely fitting the cylindrical surface at the end of the spindle; and fifth, a tool having a spindle entering end fitting the spaced conical surfaces of the spindle and having separated lugs on an outwardly extending flange adapted to fit against the interrupted conical surface on the collar.

Referring more in detail to the figures of the drawing, I provide a spindle 10 which may be of any standard or usual form adapted to be rotated in any preferred manner (not shown). At the lower or tool mounting end thereof this spindle is provided with a recess, there being a conical surface 11 at the end of the recess. Above this conical surface 11 is an elongated cylindrical surface 12 and above the cylindrical surface is a second conical surface 13. The apex angles of the conical surfaces 11 and 13 are great enough to prevent the tool from becoming wedged or locked in the spindle but sufficient to retain the tool firmly and rigidly in position when held upwardly in position. It will be understood that the distance between the two conical surfaces determined by the length of the cylindrical surface 12 may be widely varied.

Upon the outer surface of the spindle 10 adjacent its tool mounting end are screw threads 14, there being two or three convolutions thereof and at the end of the spindle is a short cylindrical surface 15 the purpose of which will presently be described.

Entering the spindle recess is a cutting tool 16, the one shown in the figures being an adjustable boring tool having a single angularly disposed cutter 17 adjustable radially by rotating a sleeve 18 upon the body of the tool 16. The spindle entering projection 19 of the tool 16 is provided with conical portions 20 and 21 adapted to accurately fit the conical recess portions 11 and 13 of the spindle 10, there being a cylindrical portion 22 formed on the tool of slightly reduced diameter so that this portion does not contact with the cylindrical portion 12 of the spindle. Along one side of this spindle entering end 19 of the tool is a flattened portion 23 upon which indications may be marked for mounting the tool angularly within the spindle with respect to a mark (not shown) on the spindle.

Between the spindle entering end 19 of the tool and its body portion 16 is a flange portion 24 having spaced lugs 25, there being preferably three such lugs in the embodiment shown in the drawing, spaced relatively widely apart. The lower surfaces 26 of these projections or lugs 25 are bevelled as shown at a relatively steep angle.

Surrounding the spindle 10 is a collar or sleeve 28, the upper portion of which is provided with internal screw threads adapted to be threaded upon the screw threads 14 on the spindle and intermediate its length is an internally extending peripheral flange 29 adapted to closely engage the cylindrical surface 15 at the end of the spindle 10 so that the sleeve 28 may be accurately guided upon the spindle. The outer surface of this collar or sleeve 28 may be knurled, as shown at 30, and one or more recesses 31 provided for a spanner wrench by means of which the sleeve may be tightened upon the spindle.

The lower portion of the collar or sleeve 28 is provided with an inwardly extending portion 32, the upper surface 33 of which is bevelled and interrupted to form relatively wide bearing surfaces and sufficiently wide openings for the lugs 25 on the tool 16 to pass. The internal bevelled surface 33 of the collar or sleeve 28 accurately engages the bevelled surfaces 26 on the lugs 25 and upon rotation of the collar or sleeve 28 after the tool 16 has been inserted manually within the recess of the spindle forces the tool 16 upwardly and firmly into contact with the conical surfaces 11 and 13 of the recess. This upward movement of the tool 16 is accomplished by the upward movement of the sleeve 28 due to its threaded engagement with the spindle and the engagement of the surface 33 on the sleeve with the lugs 25 on the tool. During this engagement the cylindrical surface 15 and the corresponding cylindrical surface on the internal flange 29 aid in guiding the sleeve 28 and thus aid in properly centering the tool 16 in its driving position within the spindle.

I claim as my invention:

1. Tool mounting means for machine tools having a rotating spindle comprising in combination, a spindle having a recess therein at its tool receiving end, spaced conical bearing surfaces formed within said recess, a collar threaded upon the end of said spindle and having an inwardly extending interrupted flange thereon, a tool extending within said recess and having spaced conical portions fitting said conical surfaces on said spindle, and spaced lugs on said tool adapted to pass through openings within said interrupted flange of said collar and engage a surface thereof and force said tool into said recess against said bearing surfaces when said collar is rotated.

2. Tool mounting means for machine tools having a rotating spindle comprising in combination, a spindle having a recess therein at its tool receiving end, spaced conical bearing surfaces formed within said recess, a collar threaded upon the end of said spindle, interengaging guiding surfaces on said spindle and collar adjacent said threaded portions, said collar having an inwardly extending interrupted flange thereon, a conical surface on said flange, a tool extending within said recess and having spaced conical portions fitting said conical surfaces on said spindle, and spaced lugs on said tool adapted to pass through openings in said collar and engage the conical surface on said flange to force said tool into said recess when said collar is rotated.

JOHN M. RUSNAK.